United States Patent Office 2,898,786
Patented Aug. 11, 1959

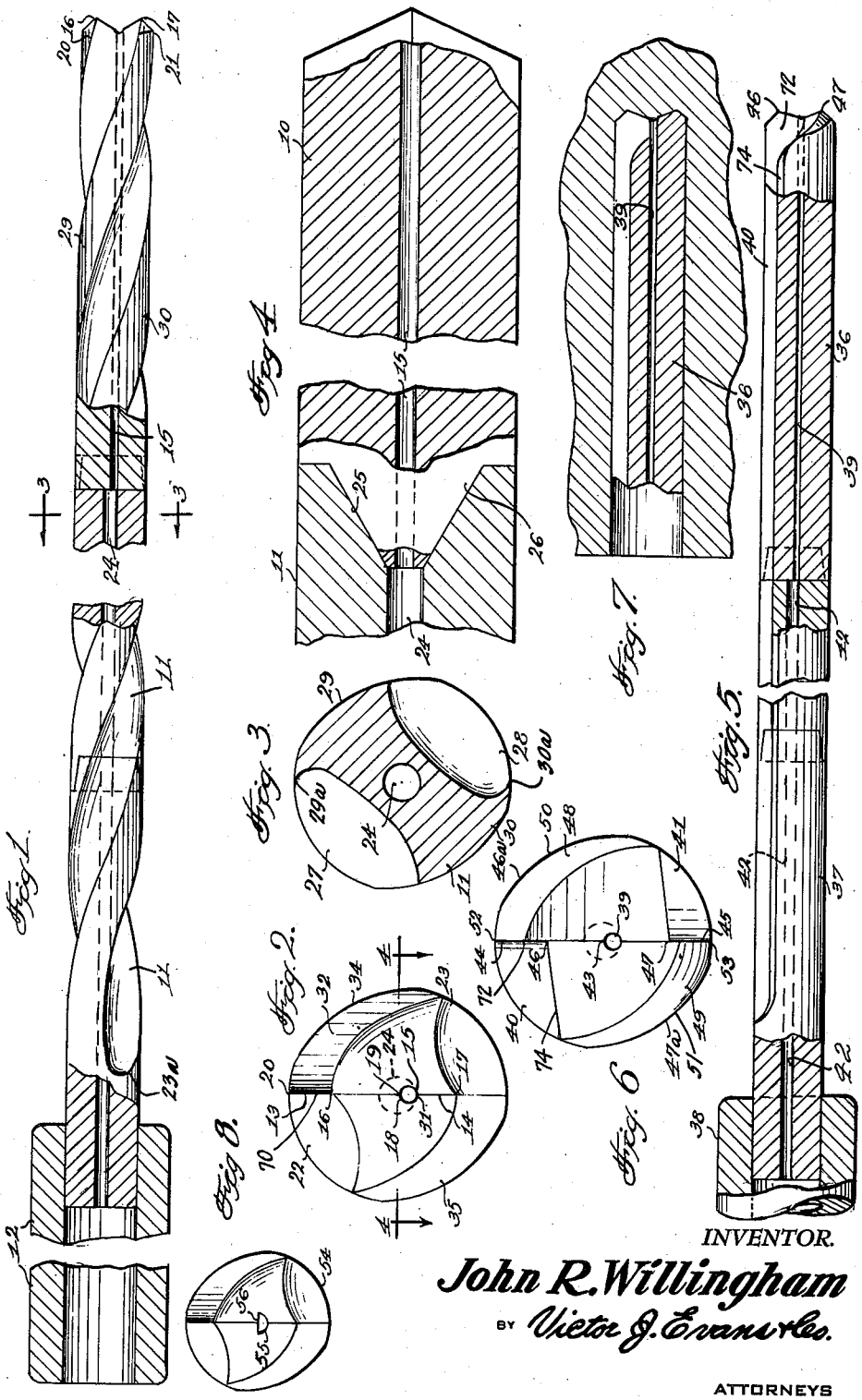

2,898,786
BLIND HOLE DRILL
John R. Willingham, Detroit, Mich.
Application December 14, 1955, Serial No. 553,074
2 Claims. (Cl. 77—68)

This invention relates to blind hole drilling tools particularly of the type adapted to be operated at high speed and used for drilling deep holes, and in particular a drill with straight or spiral flutes in the peripheral surface and having an eccentrically positioned longitudinally disposed lubricating passage extended therethrough, and wherein the passage is spaced from the center of the drill so that the pin usually formed in the center of the hole is cut away and a finished blind hole is drilled.

The drilling tool shown in my prior patent No. 2,674,908 has an eccentrically positioned lubricating opening which includes the tool axis so that a pin is formed during a drilling operation. Manifestly, such a tool is limited in use to drilling holes which extend completely through the workpiece, since in drilling a blind hole the pin formed by the drill could not be removed. The drilling tool of this invention includes a tip having a cutting edge which extends radially of the tool from the axis to the outer edge thereof so that during drilling of a hole no pin is formed.

The purpose of this invention is to provide an improvement in drills whereby blind holes may be drilled in cylinders, blocks, and other parts of machinery and equipment at relatively high speed and in a single operation.

With the conventional type of drill and particularly drills of the spiral type it is difficult to supply lubricant to the cutting tip in sufficient quantities to retain an operative temperature in the drill and parts being drilled and with long drills having offset openings or single cutting edges it is impossible to hold the center of the drill on the axial center of the hole so that the drilling of a finished hole in one operation is substantially impossible.

With this thought in mind this invention contemplates a drill having a longitudinally extending fluid passage which is eccentrically positioned so that the edge thereof adjacent to the center or axis of the drill is spaced from the center sufficiently to provide for a location of the cutting edges at the tip of the drill such that the workpiece portion through which the drill passes is completely cut away.

The object of this invention is, therefore, to provide a high speed drill having an eccentrically positioned lubricating passage in which the drill is adapted to drill an open unobstructed blind hole.

Another object of the invention is to provide a drill for cutting a blind hole at relatively high speed in which the hole is cut and the wall thereof finished in a single operation.

A further object of the invention is to provide an improved drill for cutting a blind hole at relatively high speed and in a single operation in which the drill is of a relatively simple and economical construction.

Still a further object of the invention is to provide a drill of the above type in which the cutting edges are spaced at their inner ends to facilitate access of the usual grinding elements for maintaining the cutting edges in a sharp condition.

With these and other objects and advantages in view the invention embodies a drill having a plurality of cutting edges with an eccentrically positioned longitudinally disposed fluid passage extended through the intermediate part in which the fluid passage is offset with the wall thereof on or beyond the axial center of the drill wherein the cutting edge on one side of the drill is longer than the cutting edge on the opposite side.

Other features and advantages of the invention will appear from the following description taken in connection with the drawing, wherein:

Figure 1 is a side elevational view illustrating the improved drill with parts broken away and with parts shown in section.

Figure 2 is an end elevational view of the drill shown in Fig. 1 with the parts shown on an enlarged scale.

Figure 3 is a cross section through the shank of the drill taken on line 3—3 of Fig. 1, also with the parts shown on an enlarged scale.

Figure 4 is a sectional plan through the tip of the drill taken on line 4—4 of Fig. 2 and also with the parts shown on an enlarged scale.

Figure 5 is a longitudinal section with parts broken away and parts shown in elevation illustrating a modification wherein the drill is provided with straight flutes.

Figure 6 is an end elevational view of the drill shown in Fig. 5.

Figure 7 is a longitudinal section through the tip of the drill showing the drill in an opening in a block of material with the material shown in section and with parts broken away.

Figure 8 is an end elevational view of the drill showing a further modification in which the lubricant passage which is positioned on one side of the axial center of the drill is of semi-circular shape.

Referring now to the drawing wherein like reference characters denote corresponding parts the improved drill of this invention includes a drill tip 10 of carbide or other similar material carried on the end of a shank 11 and the opposite end of the shank is mounted in an adapter 12.

The drill tip 10 is provided with cutting edges 13 and 14 which extend from an eccentrically positioned opening 15 extended longitudinally through the tip and, as shown in Fig. 2 the cutting edge 13 is provided with a point 16 and the cutting edge 14 with a similar point 17.

The bore or lubricant passage 15 is positioned whereby the inner wall 18 thereof is on the center 19 of the drill whereby the cutting edge 13 is continuous from a point 20 at the periphery of the drill to the center so that in the operation of the drill a complete opening is provided.

With the opening 15 positioned on one side of the center 19 the distance from the inner wall of the opening 18 to the point 20 on the periphery of the drill is greater than the distance from the opposite wall of the opening 15 to a point 21 at the intersection of the cutting edge 14 with the peripheral surface of the drill. By this means lubricant forced through the passage 15 flushes chips cut by the cutting edges 13 and 14 whereby the chips are washed back through chip carrying channels 22 and 23 that extend from the tip of the drill to points 23a of the shank. The points 23a are spaced from the end of the adapter 12, as shown in Fig. 1.

The shank 11 which may be provided with a plurality of sections is provided with a bore 24 and the end of each section of the shank is provided with a counterbore 25 in which a conical-shaped section 26 on the end of the drill head or on an adjoining section is positioned.

The flutes 22 and 23 of the drill head are in registering relation with similar flutes 27 and 28 in the sections of the shank 11 and the drill head and shank are provided with lands 29 and 30 that provide the body of the drill, The cutting edges of the drill, which are referred to by the reference numerals 13 and 14, extend forwardly from the points 20 and 21 to the points 16 and 17 and from the points 16 and 17 the cutting edges extend inardly toward the center of the drill, with the cutting edge 13 terminating at a point 19 and the cutting edge 14 terminating at a point 31 on the opposite side of the opening or passage 15. The ends of the lands of the drill are provided with beveled surfaces 32 and 33 on the trailing or back sides of the cutting edges 13 and 14 during drilling and the peripheral surfaces 34 and 35 of the lands are relieved slightly as shown in Fig. 2.

In Figs. 5, 6, and 7 a drill body 36 is shown on the end of a shank 37 which extends from an adapter 38 and the drill head, which is provided with an eccentrically positioned bore 39 is provided with flutes 40 and 41, which, instead of being spiral, as shown in Fig. 1, are straight or parallel.

The lubricant passage or bore 39 is in registering relation with a bore 42 extended through the shank 37 and, as illustrated in Fig. 6, the inner wall of the lubricant passage or bore 39 is positioned on the center 43 of the drill with the passage 39 on one side of the center.

In this design the drill tip is provided with cutting edges 44 and 45 in which points 46 and 47 are positioned, and, as shown in Fig. 6 the length of the cutting edge 44 is greater than that of the cutting edge 45. The end surfaces of lands 46a and 47a are also beveled as indicated by the numerals 48 and 49 and parts of the peripheral surfaces of the lands are cut away or flattened as indicated by the numerals 50 and 51.

In the design shown in Fig. 2 the leading sides of the lands 29 and 30 are provided with sharp scraping edges as indicated by the numerals 29a and 30a and in the design shown in Fig. 6 the leading sides of the lands are provided with similar cutting edges as indicated by the numerals 52 and 53.

In the design illustrated in Fig. 8 a drill 54 similar to the drill 10 is provided with a semi-circular or elongated lubricant passage 55 which is positioned on one side of the center 56 of the drill and, it will be understood that the lubricant passage may be of any suitable shape in cross section.

In both the drills illustrated in Figs. 2 and 6 the leading sides of the cutting edges are located at the ends of the chip-carrying channels or flutes. For example, the leading side of the cutting edge 13 is at one end of one side wall 70 of the channel 22. Likewise, the leading side of the cutting edge 44 is at one end of one side wall 72 of the channel 40 which has a second side wall 74. As shown in Fig. 5 the tip 36 is ground so that the channel wall 74 is inclined toward the cutting edge point 47. This elongates the side wall 72 so that it includes all of the cutting edge 44. Grinding of the tip 36 to sharpen the edge 44 is facilitated by this construction and all chips cut from a workpiece by the edge 44 are immediately disposed in the channel 40 for travel rearwardly therein with the fluid issuing from the passage 39.

It will be understood that other modifications may be made in the design and arrangement of the parts without departing from the spirit of the invention.

What is claimed is:

1. A drill for drilling holes in metal workpieces, said drill having a generally cylindrical tip portion and a shank portion, said tip and shank portions having communicating chip-carrying channels extending longitudinally of the outer surfaces thereof and formed so that each channel has a side wall extending longitudinally of the drill, the free end of said tip portion having a pair of cutting edges extending transversely of the drill in opposite directions, each of said cutting edges being continuous and having an inner end and an outer end spaced transversely of the drill, one of said edges intersecting the longitudinal axis of said drill and terminating at its inner end substantially at said axis and the other one of said edges terminating at its inner end in a spaced relation with said axis, said cutting edges having the outer ends thereof located equal distances from said axis, each of said cutting edges having a leading side and a trailing side and having its leading side located at the end of the wall of one of said channels so that chips cut by said leading side are disposed in said channel, and means providing a longitudinally extending fluid passage in said drill terminating at said free end of said tip portion in a position displaced transversely from the path of chips traveling from said leading sides along said channels.

2. A drill for drilling holes in metal workpieces, said drill having a generally cylindrical tip portion and a shank portion, said tip and shank portions having communicating chip-carrying channels extending longitudinally of the outer surfaces thereof and formed so that each channel has a side wall extending longitudinally of the drill, the free end of said tip portion having a pair of cutting edges extending transversely of the drill in opposite directions, each of said cutting edges being continuous and having an inner end and an outer end spaced transversely of the drill, one of said edges intersecting the longitudinal axis of said drill and terminating at inner end substantially at its said axis and the other one of said edges terminating at its inner end in a spaced relation with said axis, said cutting edges having the outer ends thereof located equal distances from said axis, each of said cutting edges having a leading side and a trailing side and having its leading side located at the end of the wall of one of said channels so that chips cut by said leading side are disposed in said channel, and means providing a longitudinally extending fluid passage in said drill terminating at said free end of the tip portion at a position in which a diameter of said fluid passage extends between the spaced inner ends of said cutting edges.

References Cited in the file of this patent
UNITED STATES PATENTS

| | | |
|---|---|---|
| 1,379,853 | Cogsdill | May 31, 1921 |
| 2,186,725 | Hughes | Jan. 9, 1940 |
| 2,252,168 | Creighton | Aug. 12, 1941 |
| 2,325,535 | Nordberg | July 27, 1943 |
| 2,610,529 | Atkinson | Sept. 16, 1952 |
| 2,674,908 | Willingham | Apr. 13, 1954 |

FOREIGN PATENTS

| | | |
|---|---|---|
| 593,622 | Great Britain | Oct. 22, 1947 |
| 848,140 | Germany | Sept. 1, 1952 |

UNITED STATES PATENT OFFICE
CERTIFICATION OF CORRECTION

August 11, 1959

Patent No. 2,898,786

John R. Willingham

It is hereby certified that error appears in the above numbered patent requiring correction and that the said Letters Patent should read as corrected below.

Column 4, line 38, strike out "its" and insert the same after "at" in line 37, same column 4.

Signed and sealed this 9th day of May 1961.

(SEAL)
Attest:

ERNEST W. SWIDER
Attesting Officer

DAVID L. LADD
Commissioner of Patents